United States Patent
Geisler

(10) Patent No.: US 6,517,701 B1
(45) Date of Patent: Feb. 11, 2003

(54) LEAD, ZINC AND MANGANESE RECOVERY FROM AQUEOUS SOLUTIONS

(75) Inventor: Robert A. Geisler, Toronto (CA)

(73) Assignee: Centaur Mining Exploration Ltd., Toronto (CA)

( * ) Notice: Subject to any disclaimer, the term of this patent is extended or adjusted under 35 U.S.C. 154(b) by 0 days.

(21) Appl. No.: 09/928,744

(22) Filed: Aug. 14, 2001

(51) Int. Cl.⁷ .................................................. C25C 1/00
(52) U.S. Cl. .................. 205/538; 205/539; 205/544; 205/545; 423/49; 423/89; 423/99
(58) Field of Search .............................. 205/538, 539, 205/544, 545, 480; 423/49, 89, 99

(56) References Cited

U.S. PATENT DOCUMENTS 4,191,729 A    3/1980    Rinelli et al.
5,028,403 A    7/1991    Rickleton et al.
5,523,066 A    6/1996    Geisler et al.

*Primary Examiner*—Arun S. Phasge
(74) *Attorney, Agent, or Firm*—McFadden, Fincham; Alan A. Thomson

(57) ABSTRACT

Aqueous solutions containing lead, zinc and manganese are treated to recover these metals by sequential solvent extraction steps. Solvent extractants are selected to extract preferentially lead, then zinc and then manganese in that order. Any interfering metals are removed (as by ion exchange) before extraction. The loaded extractant phases are stripped with selected acids and lead, zinc and manganese each recovered from the strip solutions. Optionally calcium can be recovered when present. A preferred type of extractant (for lead especially) is substituted monothiophosphinic acids. A closed loop system is described which is advantageous with leachate from sulphide and carbonate ores.

20 Claims, 3 Drawing Sheets

LEAD, ZINC AND MANGANESE RECOVERY FROM AQUEOUS SOLUTIONS

FIELD OF THE INVENTION

This invention relates to a hydrometallurgical process for the recovery of lead oxide, zinc oxide, electrolytic manganese dioxide (EMD) and optionally precipitated calcium carbonate (PCC) from Pb, Zn, Mn, and optionally Ca, dissolved in aqueous solution or leachate (e.g. as produced by the method described in U.S. Pat. No. 5,523,066) and preferably to the combination of said process and said leaching thereby forming a closed loop system to recover the foregoing products in a manner that reduces environmental impact and economic costs to enable recovery of minerals from deposits that would be too expensive by traditional means. This zero discharge closed loop system can be expanded to also recover with equal advantage other metals dissolved by the leach method e.g. of said '066 patent. The process incorporates three selected solvent extraction steps in a particular sequence.

BACKGROUND OF THE INVENTION AND PRIOR ART

PbO (and $PbO_2$ its precursor) is vital for high performance electric batteries for automobiles and electronic appliances, ZnO is useful to manufacture automobile tires, paint, pharmaceuticals and as an additive for both human and animal food, EMD is a main ingredient for alkaline batteries used for electronic equipment and PCC is a principal component of fine paper. There are known methods to produce these products but none are able to do so with the environmental, cost and sustainable development advantages offered by the combination methodology of the present invention.

The traditional methods to derive the said products entail some combination of mining, concentration, smelting and refining to initially extract the basic raw materials i.e. Pb, Zn, Mn and Ca followed by transforming the materials to the final product conforming to industrial specifications. PbO and ZnO usually are made by oxidizing the metal either by ball milling or blowing air through its molten form; $MnO_2$ is recovered usually by electrowinning leachate from the oxidized Mn ore. In most cases, however, without purification the $MnO_2$ product is sub-standard causing explosion of batteries in which it is used; while calcium carbonate preparation may involve calcining limestone that creates considerable greenhouse gas as $CO_2$. The sum of these activities form a tedious series of steps that are expensive, replete with environmental and personal health problems, hazardous risks and the possibility of creating ugly scars to the landscape. The traditional methods entail massive land disturbance from pervasive blasting and excavations in the course of mining that can result in permanent alteration of ground water levels in the vicinities of pits, adits, waste dumps and tailings ponds. Lowering the water table through mining activities adversely affects agriculture and forestry and can expose sulphide minerals to unsaturated hydrological conditions and to rapid weathering that greatly increase the potential for long term production of acid rock drainage (ARD) and toxic metal migration.

Although Pb, and Mn can be selectively recovered electrolytically as oxides directly from multi-component leachate, e.g. produced by the '066 patent, by suitably controlling the voltage of the electrolytic cell, and Zn can be recovered similarly as a hydroxide thence converted by heating to an oxide, such products are impure because they adsorb other components in the leachate due to the surface reactivity e.g. ion exchange capacity of the products thereby becoming impure requiring cleansing to remove adsorbates to achieve commercial specifications and such cleansing is complicated and expensive. Moreover as the concentration of the Pb, Zn and Mn in the said leachate decreases during electrolytic recovery, such recovery becomes increasingly inefficient reaching a point where it is uneconomic to further recover metal in this fashion.

In U.S. Pat. 4,191,729, Mar. 4, 1980 G. Rinelli, et al, a process for leaching lead and zinc from oxidized ore using ammoniacal (with polycarboxylic acid anion) solutions at pH 11.5–12.5 is described. Selective solvent extraction of lead from the leachate using LIX-64N™ (mixture of hydroxy-aryl-, and -alkyl, -oximes) as active extractant is carried out at pH 9–10. The zinc is precipitated from residual leachate by heating.

In U.S. Pat. 5,523,066, Jun. 4, 1996, R. A. Geisler, et al, a process is described for leaching lead and other metals from sulphidic ores using acetate solutions in the presence of an oxidant. In many cases zinc, manganese and other metals are present and are also leached. Recoveries from leach solution is by known techniques (with disadvantages mentioned above). It would be desirable to selectively separate and recover high purity lead, zinc and manganese from such leach solutions in a more efficient manner.

U.S. Pat. 5,028,403, Jul. 2, 1991, W. A. Rickelton, et al., describes solvent extraction of certain metals from aqueous solutions with monothiophosphinic acids as extractant. Extraction (from sulfuric acid solutions) of zinc and manganese is described, but not lead.

SUMMARY OF THE INVENTION

Many of the foregoing problems inherent in traditional recovery of the said products are reduced by the methodology of the present invention because it minimizes or does not create waste piles, toxic discharges, water table alteration, substantial ground disturbance or human exposure to hazardous risk. Any $CO_2$ that is generated from leaching by the '066 patent methodology may be utilized to form PCC. Recovery of the products as particulates enables more automated control of their production, specifications, packaging and storage. Electrolytic cell design employing gas diffusion electrodes for counter electrodes can decrease power used by up to about 80%. Accordingly the invention has significant potential for being both an economically and environmentally sustainable mineral resource development technology.

We have surprisingly found that Pb, Zn and Mn can be selectively recovered from aqueous solution or leachate each into a separate extractant and a strip liquor forming respective dedicated solutions containing essentially no other metallic impurity. Each liquor not only provides a source enabling a purer product to be recovered electrolytically but moreover permits more of the said Pb, Zn and Mn dissolved in the feed solution or leachate to be economically recovered without incurring increasingly higher power costs as would otherwise be necessary. Such feed solutions may be derived e.g. from sulfide and/or carbonate ores.

A series of hydrometallurgical steps forming a process is described that can be joined as a preferred option with a leach method, e.g. of said '066 patent, to form a combined closed loop method that is environmentally and economically advantageous compared to existing methods to recover the desired products e.g. PbO, ZnO, EMD and optionally PCC respectively from Pb, Zn, Mn and optionally Ca (+Mg+Ba) that are dissolved usually along with many other elements in such leachates. The final products can be specially tailored for industrial use by controlling the particle size, surface area and morphology of the individual products for particular tasks. All are substantially pure except the PCC that usually includes $MgCO_3$ plus other leachate components which can make it acid tolerant for use in making paper.

The invention includes a process for recovering lead, zinc, and manganese from an aqueous solution containing these metals, comprising the selection of a solvent extractant able to preferentially extract lead in the presence of zinc and manganese, from the solution; providing that the solution is free of interfering metals; extracting the interferant-free solution with selected solvent extractant in an amount sufficient to extract the lead and separating the loaded extractant phase from the solution; selecting solvent extractant able to preferentially extract zinc in the presence of manganese; extracting the lead-free solution with selected solvent extractant in an amount sufficient to extract the zinc and separating the loaded extractant phase from the solution; selecting solvent extractant able to preferentially extract manganese in the presence of any residual metals; extracting the lead- and zinc-free solution with selected solvent extractant in an amount sufficient to extract the manganese and separating the loaded extractant phase from the solution; separately stripping each loaded extractant phase to move lead, zinc and manganese into separate aqueous acid strip solutions; and recovering, in a selected form, lead, zinc and manganese from the corresponding strip solutions.

The invention includes the use, as a preferred option, of selected monothiophosphinic acids as active extractant in each extraction step, as well as the option of using selected alternative extractants for each extraction step as described below.

The invention also includes the option of recovering lead from its strip solution at the anode of an electrolytic cell, and concurrently producing peroxide at the opposite electrode for use in leachate formation.

The invention includes the option of using $CO_2$ released during leaching to precipitate alkaline earth metal carbonates downstream of solvent extraction.

The invention includes a process for recovering lead, zinc, manganese and calcium from aqueous acetate solutions containing these but free of copper, iron, cadmium and cobalt, comprising:
 (a) extracting the aqueous solution at a pH of from 0.0 to 0.5 with an organic phase comprising substituted monothiophosphinic acid to extract lead;
 (b) extracting the lead-free aqueous solution at a pH of from 1.0 to 1.2 with an organic phase comprising at least one of substituted monothiophosphinic acids, disubstituted-phosphoric and -phosphorothioic acids, and $C_{26}H_{34}SN_2O_2$ known as LIX 34™ to extract zinc;
 (c) extracting the lead- and zinc-free aqueous solution at a pH of from 3.0 to 3.5 with an organic phase comprising at least one of substituted monothiophosphinic acids, disubstituted phosphinic acids, and disubstituted-phosphoric and -phosphorothioic acids to extract manganese;
 (d) stripping each of the loaded organic phases with an aqueous acid solution comprising one acid from the group consisting of acetic, nitric, hydrochloric and sulphuric except that sulphuric may be selected only for Mn stripping;
 (e) electrowinning lead, zinc and manganese from their respective strip solutions and recycling the depleted strip acids to step (d);
 (f) treating the remaining aqueous solution containing calcium, as acetate or hydroxide, with carbon dioxide to precipitate calcium carbonate;
 (g) recovering and recycling acetic acid to form starting solution; and
 (h) recovering lead, zinc and manganese as oxides and a precipitate comprising calcium carbonate.

DETAILED DESCRIPTION AND PREFERRED EMBODIMENTS

Figure 1:
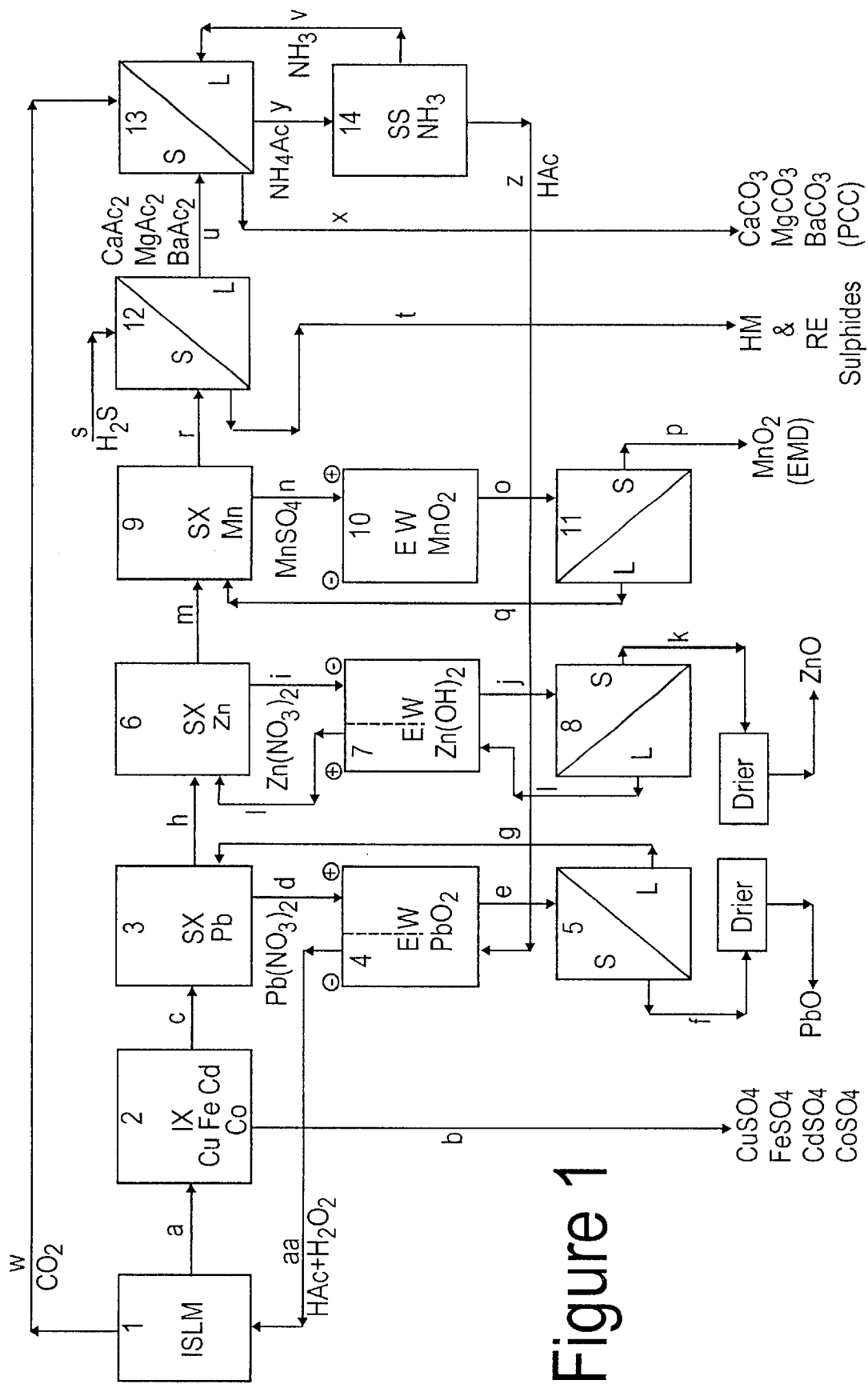
FIG. 1 is a block diagram depicting a flowsheet of one closed loop process.

The solution or leachate preferably is that formed as in the '066 US patent but other aqueous solutions however formed may be used. The concentrations of lead, zinc and manganese usually will range from about 0.5 to about 60 g/L, and calcium (plus other alkaline earth metals) from zero up to about 60 g/L. The initial pH may range from about 2 to about 5 and can be adjusted as necessary e.g. using $NH_4OH$ or nitric acid. The acid in the starting solution may be selected from carboxylic acids (e.g. formic and acetic) and mineral acids. The process has been found particularly advantageous for acetate solutions.

The extractant is selected to be selective for each of lead, zinc and manganese in sequence.

For lead, the extractant may be selected from substituted monothiophosphinic acids and high molecular weight polyethers having macrocyclic moieties such as crown ethers. We have found substituted monothiophosphinic acids (as described in U.S. Pat. No. 5,028,403) to be preferred. While any of the various alkyl- and aryl-type substituents on the phosphinic acid may be used a preferred one is bis(2,4,4-trimethylpentyl)-monothiophosphinic acid known as Cyanex 302™ (of Cytec Industries Inc.). Another type of extractant suitable for lead is the macrocyclic polyethers (crown ethers) of the type di-t-butycyclohexano-18-crown6. Substitutents forming the cyclic polyethers may be selected from alkylene and cycloalkylene groups. Solution pH for this extraction preferably is about 0.0 to 0.5.

For zinc, the extractant may be selected from disubstituted-phosphoric and -phosphorothioic acids, $C_{26}H_{34}SN_2O_2$ type known as LIX 34™ and the substituted monothiophosphinic acids as above. We have found the latter to be preferred. Solution pH for Zn extraction preferably is about 1.0 to 1.2.

For manganese, the extractant may be selected from disubstituted phosphinic acids, e.g. (bis(2,4,4,-trimethylpentyl) phosphinic acid (Cyanex 272™) disubstituted phosphoric and -phosphorothioic acids and the substituted monothiophosphinic acids as above. Again we have found the latter to be preferred. Solution pH for Mn extraction preferably is about 3.0 to 3.5.

Diluents as described in U.S. Pat. No. 5,028,403 may be used with the active extractants. Various diluents are known to those skilled in the art, and any appropriate ones may be used.

As described below the presence of copper and/or iron has been found to interfere with extraction when using monothiophosphinic acids by degrading the extractant. Cadmium and cobalt have been found to co-extract with the lead (if present) and prevent obtaining lead of the desired purity. These interfering metals are removed before extraction e.g. by ion exchange. Suitable IX resins to extract selectively Cu, Fe, Cd, Co from acidic feed solutions are:

for Cu: "Dowex 21K16/20" made by Dow Chem. Co.

for Fe: "Sybron SR12" made by Sybron Chemicals Inc. or preferably "Diphonix" made by Eichrom Technologies Inc.

for Cd: "Cadmium Resin" made by Eichrom Tech. Inc.

for Co: "Dowex FS 4195" made by Dow Chem. Co.

The amounts of extractant phase (e.g. 20% extractant+ 80% diluent) relative to the aqueous phase O/A above may range from about 1/1.1 to 1/5. To achieve the selectivity and purity desired, the amount of active extractant is chosen to extract only slightly more of the desired metal than is expected to be present in the feed solution and preferably the extractant phase (after loading) is scrubbed with a solution of a salt of the desired metal and the chosen strip acid. Such scrubbing displaces any co-extracted undesired metal as is illustrated in the examples.

The strip acid may be chosen based inter alia on the following criteria: suitable pH range, no precipitate formation, during electrolytic treatment acceptable oxidation of loaded strip solution, and membrane compatibility.

Strip acids found preferable are for lead=acetic, nitric, hydrochloric;

for zinc=acetic, nitric, hydrochloric;

for manganese=sulphuric, acetic, nitric, hydrochloric.

The concentration of strip acids may range from about 1 to about 63 g/L (pH about 0.0 to 3.0).

The process can be adapted to recycle $CO_2$, acetic acid, strip acids and ammonia as explained below and in the flowsheet. This enables operation as a closed loop system with inherent advantages. Of particular advantage is the co-generation of peroxide (for ore leaching) in the lead electrowinning stage.

With reference to FIG. 1 as a preferred option, leaching (1) conducted according to the '066 patent generates leachate (a) containing the dissolved constituents plus $CO_2$ (w) as a separate component. Preferably the organic extractant bis(2,4,4-trimethylpentyl)-monothiophosphinic acid with the molecular formula $(C_8H_{17})_2P(S)OH$ described in U.S. Pat. No. 5,028,403 and sold under the trade name "Cyanex 302"™ is employed to recover selectively the Pb, Zn and Mn from the leachate. This '403 patent only claims the ability for Cyanex 302 to recover Zn and Mn among other metals from solutions and makes no claim nor gives any indication of the ability of the said Cyanex 302 to also recover dissolved Pb from a solution. Tests have shown surprisingly that the Cyanex 302 does in fact extract Pb before Zn and Mn from an acid solution in the pH range 1.0 to 7.0. However, tests have now shown that the Cyanex 302 co-extracts Cd and Co with Pb in these conditions and therefore if said leachate solution is devoid of or depleted in Cd and Co the Cyanex 302 can be successfully employed to selectively recover Pb, Zn and Mn in that order. Moreover, it has been found that use of the said Cyanex 302 for periods of about a week or so to recover Cu and/or Fe (as in the '403 patent) degrades the Cyanex 302 by converting it from a sulphonated to an oxygenated species (with the released sulphur forming sulphides with metals that are present), thereby destroying the ability of the said Cyanex 302 to selectively extract the desired metals. Accordingly, the invention initially removes when present, Cu and Fe from the leachate, e.g. by means of an ion exchange (IX) resin or precipitation, to prevent Cyanex 302 degradation and further removes any Cd and Co from the said leachate, e.g. also by means of IX or precipitation, to enable selective extraction of the Pb, Zn and Mn in that order from the leachate by means of the Cyanex 302 or other extractants as described.

The leachate (a) is treated (2) by ion exchange (IX) employing a combination of suitable resins of which a number are well known to those versed in the art, to recover all the dissolved Cu, Fe, Cd and Co and thereby avoid or minimize Cu and Fe preventing the long-term re-use of the Cyanex 302 type extractant and also avoid or minimize the co-extraction of Cd and Co with Pb. The Cu, Fe, Cd and Co in the leachate are ion exchanged onto resins from which they are removed by stripping e.g. with $H_2SO_4$ to form mixed $CuSO_4+FeSO_4+CdSO_4+CoSO_4$ solution (b) that may be utilized industrially.

The reactions (for acetate leachate) in which —/= indicate bonds, and where R is IX resin are:

 (1)

 (2)

 (3)

 (4)

 (5)

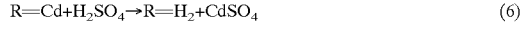 (6)

 (7)

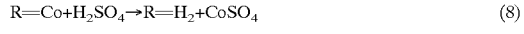 (8)

In this embodiment Cu+Fe+Cd+Co-free leachate (c) is treated (3) by solvent extraction (SX) employing the organic extractant Cyanex 302 at a concentration, e.g. of 20 wt % Cyanex in a diluent such as kerosene to selectively recover Pb by means of sequential extraction, scrubbing and stripping procedures into a strip liquor containing about 100 gpl of Pb (as $Pb(NO_3)_2$). Extraction preferably is performed in two stages at an organic/aqueous (O/A) ratio advance of about 1/6.4 and a mixer O/A of about 1.2/1; scrubbing is performed in one stage at an O/A ratio advance of about 40/1 and mixer O/A ratio of about 1.2/1; and stripping is performed in one stage at an O/A ratio advance of about 5/1 and mixer O/A ratio of about 1.2/1. The extraction and stripping reactions are:

($R_2PSOH$=monothiophosphinic acid extractant)

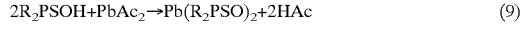 (9)

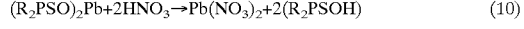 (10)

Alternatively, a macrocyclic polyether e.g. crown ether, $DtBuCH_{18}C_6$ manufactured by Eichrome Industries Inc. may be used instead of Cyanex 302 type to selectively recover the Pb from the leachate.

The strip liquor (d) e.g. containing $Pb(NO_3)_2$, is treated (4) preferably by electrowinning (EW) at the anode of a divided electrolytic cell to extract about 80% of its dissolved Pb (i.e. leaving a concentration of about 20 gpl in the strip liquor) that deposits on the anode as $PbO_2$. The pH of the strip liquor preferably is between 1.5 and 4.0. The appropriate potential range for the EW reaction is determined from a Pourbaix diagram for the pH at which the reaction occurs. The anode is of the type industrially referred to as a dimensionally stable anode (DSA) such as made of Ti coated with Pt and/or Ir to withstand current reversal and acid attack. It is textured to provide a microscopic area >2× the geometric area and the re-circulation velocity of the liquor through the anode compartment is suitably increased in order for the combined effect of these features to maximize mass transfer and thereby current efficiency. The $PbO_2$ forms as a fluffy deposit at the anode. The feed solution re-circulation rate plus hydrogen and oxygen gases evolved at the anode due to incomplete reactions tend to cause the $PbO_2$ to spall off the anode and be carried away with the discharging anolyte. $PbO_2$ disengagement can be further assisted if necessary by momentary potential reversal that reduces a thin layer of the $PbO_2$ deposit at the interface with the electrode to soluble Pb (II) to detach the deposit, or by ultrasonic vibration in the anolyte.

The EW cell (4) is divided with a monovalent cation exchange membrane (MCEM) to help prevent dissolved Pb from migrating to deposit on the cathode, and to enable $H_2O_2$ to be created in the cathode compartment as a preferred embodiment. Suitable monovalent cation exchange membranes (MCEM) are made by two Japanese companies i.e. Asahi Soda and Tokoyama, and by Dupont Inc. (under the trade name Nafion). To produce $H_2O_2$ the depleted leachate (z) from subsequent step (14) is diverted through the cathode compartment and fed with $O_2$. The cathode preferably is a gas diffusion electrode (GDE) consisting of carbon-felt treated with a cationic surfactant e.g. Aliquat 336™ (tricaprylmethylammonium chloride) at mMol levels that provides a high pH environment to enable the $O_2$ in the depleted leachate to be reduced to $H_2O_2$ thereby converting said leachate to fresh leach solution (aa) that is recycled to the initial leaching. Oxygen depolarization by the GDE (to generate $H_2O_2$) enables a saving of about 47% of the power otherwise consumed by the cells.

The reactions to recover $PbO_2$ and $H_2O_2$ are:
At the Anode

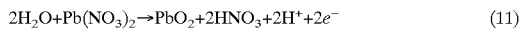

$$2H_2O+Pb(NO_3)_2 \rightarrow PbO_2+2HNO_3+2H^++2e^- \quad (11)$$

At the Cathode

$$O_2+2H^++2e^- \rightarrow H_2O_2 \quad (12)$$

Important advantages of this configuration are:
Simultaneous recovery of $PbO_2$ and $H_2O_2$ at opposite electrodes of the same cell with the same current economizes on power costs and labour utilization;
Discharging the $PbO_2$ as particulates enables automation of further handling for washing, drying, conversion to PbO, storage, packaging and shipping thereby reducing costs and time.

Discharge (e) from (4) consisting of a slurry mixture of strip liquor (d) depleted in Pb plus $PbO_2$ particles is filtered (5). The solid phase (f) consisting of $PbO_2$ filter cake is discharged to washing and drying during which it is converted to the final product PbO by heating to e.g. 752° C. to remove oxygen; the liquid phase (g) consisting of $Pb(NO_3)_2$ containing about 20 gpl Pb is returned to (3) to become the fresh strip solution for the solvent extraction step where it picks up additional Pb to become (d).

Pb-free leachate (h) discharged from (3) is re-treated by solvent extraction (6) e.g. preferably employing the extractant Cyanex 302 at a concentration of 20 wt % Cyanex in kerosene. The extractant selectively recovers Zn as in (3) by means of sequential extraction, scrubbing and stripping procedures into a strip liquor (i) as $Zn(NO_3)_2$ containing about 100 gpl of Zn. Extraction is performed in two stages at an O/A ratio advance of about 1/6.4 and O/A in mixer of about 1.2/1; scrubbing is performed in one stage at an O/A ratio advance of about 40/1 and O/A in mixer of about 1.2/1; stripping is performed in one stage at an O/A ratio advance of about 5/1 and O/A in mixer of about 1.2/1. The Cyanex 302™ Zn extraction and stripping reactions are:

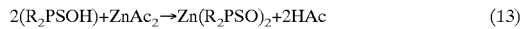

$$2(R_2PSOH)+ZnAc_2 \rightarrow Zn(R_2PSO)_2+2HAc \quad (13)$$

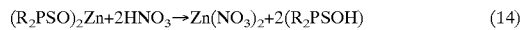

$$(R_2PSO)_2Zn+2HNO_3 \rightarrow Zn(NO_3)_2+2(R_2PSOH) \quad (14)$$

Alternatively either di(2-ethylhexyl) phosphoric acid (D2EHPA) (e.g. manufactured by Albright & Wilson Americas Inc) or D2EHTPA ($C_{16}H_{35}O_3PS$) (e.g. manufactured by Bayer AG) or the $C_{26}H_{34}SN_2O_2$ type extractant manufactured by Cognis Corp under the trade name LIX 34, may be used instead of Cyanex 302 to selectively extract Zn from the solution.

The $Zn(NO_3)_2$ strip liquor (i) is treated (7) by EW at the cathode of a divided electrolytic cell to extract about 80% of its dissolved Zn (i.e down to a concentration of about 20 gpl in the strip liquor) which deposits as $Zn(OH)_2$ (by making the solution alkaline at the electrode surface) and then carried away in the discharge catholyte. Anions from the $Zn(NO_3)_2$ strip liquor are transferred to the anolyte thereby regenerating the corresponding acid. Preferably the cathode is constructed of Ti as in (4) and the anode is a GDE as in step (4). Oxygen depolarization by the GDE enables a saving of about 35% of the power otherwise consumed by the cells. The EW cell is divided with an anion exchange membrane (AEM) to prevent dissolved Zn from migrating to the anode for deposition. The appropriate potential to recover the $Zn(OH)_2$ is determined from a Pourbaix diagram for the pH at which the reaction occurs (usually −0.06 to −0.5 volts is suitable).

Discharge (j) from (7) consisting of a slurry mixture of strip liquor (i) depleted to contain about 20 gpl Zn, plus $Zn(OH)_2$ particles is filtered in (8). The solid phase (k) consisting of $Zn(OH)_2$ filter cake is discharged to washing followed by heating to about 125° C. to convert the cake to ZnO. Filtrate (I) consisting of the depleted strip liquor is returned to the anode compartment of cell (7) where it picks up $HNO_3$ and then exits to become the fresh strip solution for the solvent extraction step (6) where it picks up additional Zn and is recycled as (i). The reactions for EW and conversion to ZnO are:
At the Cathode

$$1/2O_2+H_2O+2e^- \rightarrow 2OH^- \quad (15)$$

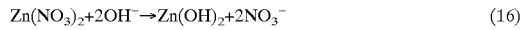

$$Zn(NO_3)_2+2OH^- \rightarrow Zn(OH)_2+2NO_3^- \quad (16)$$

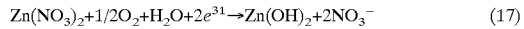

$$Zn(NO_3)_2+1/2O_2+H_2O+2e^{31} \rightarrow Zn(OH)_2+2NO_3^- \quad (17)$$

Anode

$$H_2O+2e^- \rightarrow 1/2O_2+2H^+ \quad (18)$$

Overall Cell (7) (Reaction (17)+(18))

$$Zn(NO_3)_2+2H_2O \rightarrow Zn(OH)_2+2HNO_3 \quad (19)$$

Drying

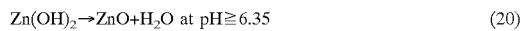

$$Zn(OH)_2 \rightarrow ZnO+H_2O \text{ at pH} \geq 6.35 \quad (20)$$

Pb- and Zn-free leachate (m) discharged from (6) is re-treated by solvent extraction (9) e.g. preferably employing the same organic extractant Cyanex 302 at a concentration of 20 wt % in kerosene, to selectively extract Mn by means of sequential extraction, scrubbing and stripping procedures into a strip e.g. sulfuric acid liquor (n) as $MnSO_4$ containing about 100 gpl of Mn. Extraction is performed in three stages at an O/A ratio advance of about 1/6 and O/A in mixer of about 1.2/1; scrubbing is performed in one stage at an O/A ratio advance of about 40/1 and O/A in mixer of about 1.2/1 using a bleed of Mn strip liquor; stripping is performed in one stage at an O/A ratio advance of about 13.3/1 and O/A in mixer of about 1.2/1. The extraction and stripping reactions are:

$$2(R_2PSOH)+MnAc_2 \rightarrow Mn(R_2PSO)_2+2HAc \quad (21)$$

$$(R_2PSO)_2Mn+2H_2SO_4 \rightarrow MnSO_4+2(R_2PSOH) \quad (22)$$

Alternative SX extractants for Mn include disubstituted phosphinic acids, and disubstituted-phosphoric and -phosphorothioic acids. The monothiophosphinic acids are preferred.

The % recovery in each SX/strip sequence has been found to be at least about 95% for Pb, Zn and Mn. The $MnSO_4$ strip liquor (n) is treated (10) at the anode of an electrolytic cell to recover about 80% of its dissolved Mn (i.e. to a residual concentration of about 20 gpl in the strip liquor) which deposits on the anode as $MnO_2$. It is spontaneously disengaged from the anode and carried away in the discharge anolyte by the mechanism described for the $PbO_2$ in (4). The anode is a DSA type electrode as described for (4); the cathode is a GDE as in step (4) to enable consumption of hydrogen and thereby reduce the cell voltage and consequently the power consumption to about 50% of what it would otherwise be. Oxygen depolarization by the GDE enables a saving of up to about 80% of the power otherwise consumed by the cells. The appropriate potential to recover the $MnO_2$ is determined from a Pourbaix diagram for the pH at which the reaction occurs (for example a cell voltage of 1.228 V or more for pH 3.0 has been found suitable).

Discharge (o) from (10) consisting of a slurry mixture of strip liquor (n) depleted in Mn, plus $MnO_2$ particles, is filtered in (11). The solid phase (p) consisting of $MnO_2$ filter cake is discharged to washing followed by drying; the liquid phase (q) consisting of $MnSO_4$ containing about 20 gpl Mn is returned to become the fresh strip solution for the solvent extraction step (9) where it picks up additional Mn to become (n). The reactions are:

At the Anode $$MnSO_4+2H_2O \rightarrow MnO_2+2H^++2H_2SO_4+2e^- \quad (23)$$

At the Cathode $$4H^++O_2+4e^- \rightarrow H_2O \quad (24)$$

Pb-, Zn-, Mn-free leachate (r) discharged from (9) optionally is treated by adding $H_2S$ gas (s) to precipitate as sulphides all of the remaining contained dissolved heavy and rare earth metals that are then recovered by filtration (12) and discharged (t) for washing and storage or sale.

The heavy and rare earth metal-free leachate (u) is treated (13) to recover its dissolved Ca, (Mg and Ba) as (combined) carbonates (PCC) by adding $NH_3$ (v) to raise the pH of the leachate to an appropriate level e.g. about 8.0 to 11.0 followed by the addition of $CO_2$ (w) (e.g. recovered during (1) from dissolving carbonates such as $CaCO_3$, $MnCO_3$, $BaCO_3$ and $MgCO_3$ associated with the sulphide mineralization being leached) to precipitate the PCC. The reaction converts the solution to an $NH_4Ac$ one. During this step the temperature of the reaction may be appropriately controlled to adjust the desired morphology and particle size of the resulting PCC. Following solid-liquid separation the solid phase PCC (x) is discharged for washing, packaging and sale. The reactions to precipitate PCC are:

$$NH_3+H_2O \rightarrow NH_4OH \quad (25)$$

$$2NH_4OH+CO_2 \rightarrow (NH_4)_2CO_3 \quad (26)$$

$$(NH_4)_2CO_3+CaAc_2 \rightarrow CaCO_3+2NH_4Ac \quad (27)$$

The liquid phase (y) resulting from (13) consisting essentially of $NH_4Ac$ solution is treated by steam stripping (SS) (14) that converts the $NH_4Ac$ to HAc containing minor dissolved alkalis, plus $NH_3$ which becomes $NH_4OH$ in solution. The former is discharged (z) and the latter recycled (v) to (13) to precipitate PCC. The steam stripping reactions are:

$$NH_4Ac \rightarrow NH_3+HAc \quad (28)$$

$$NH_3+H_2O \rightarrow NH_4OH \quad (29)$$

Preferably the HAc (z) from (14) is combined with $H_2O_2$ generated in the cathode compartment of (4) to form fresh leach solution (aa) that is recycled to (1) to extract additional components (e.g. from the orebody). The reactions to produce $H_2O_2$ are according to equation (12) above.

Alternative Options

Figure 2:
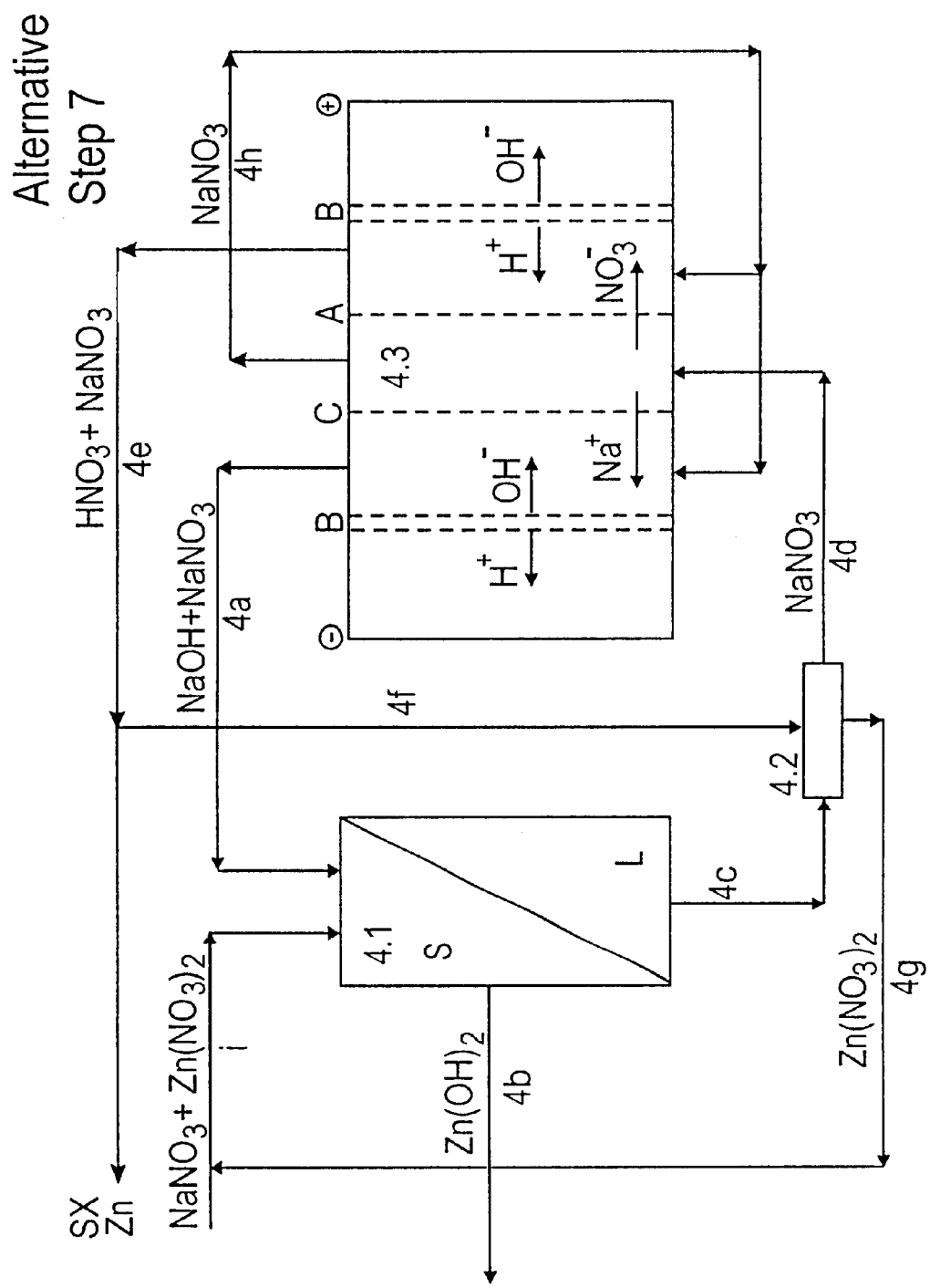
FIG. 2 is an alternative flowsheet to perform step (7) in FIG. 1 by means of precipitation, ion exchange polishing and salt splitting.

A FIG. 2 depicts an alternative option to step (7) in FIG. 1 to recover $Zn(OH)_2$. The pregnant $Zn(NO_3)_2$ strip liquor (including some $NaNO_3$ as discussed below) (i) discharged from step (6) in FIG. 1, is combined with NaOH (including some $NaNO_3$ as discussed below) (4a) to precipitate $Zn(OH)_2$ (4b) in $NaNO_3$ liquid phase (4c). The precipitate and liquid phase form a slurry that is separated by filtration (4.1)). The $Zn(OH)_2$ solid phase (4b) is discharged to washing and heating (to about 125° C.) to form ZnO. The $NaNO_3$ liquid phase (4c) discharging from (4.1) is purified in (4.2) by removing Zn as described below to yield $NaNO_3$ (4d) and then treated by electrodialysis in a system (4.3) consisting of bipolar membranes (B), AEM (A) and cation exchange membranes (C) to separately recover $NaOH+NaNO_3$ (4a) and $HNO_3$ $+NaNO_3$ (4e) that are respectively recycled to precipitate additional Zn $(OH)_2$ and to form fresh strip liquor (i).

A portion of the $NaNO_3$ (4d) fed to electro-dialysis remains undivided in order to maintain electrical conductivity in the system. It discharges as $NaNO_3$ (4h) that is recycled in equal amounts through the B-A and B-C compartments of the system to respectively flush out the $HNO_3$ and NaOH that are generated. The $NaNO_3$ flush (4h) remains as a separate component recirculating around the process in the manner of a catalyst that does not report with the final product $(ZnOH)_2$ (4b).

Zn is amphoteric, consequently it is important to mix the $Zn(NO_3)_2$ and NaOH precisely at pH 9.21 prior to filtration in (4.1) otherwise some Zn will remain in solution and unless removed will report with the $NaNO_3$ fed to the electrodialysis system (4.3) where it will precipitate in membranes to impair their operation. Some dissolved Zn usually reports with the discharging solution (4c). Accordingly such discharge solution (4c) is treated by IX in system (4.2) that polishes it to remove trace amounts of contained Zn and thereby yield Zn-free $NaNO_3$ (4d) that is fed to the electro dialysis system. The IX system employs resins well known to those knowledgeable in the art and is periodically eluted with a bleed (4f) from (4e) forming the Zn(NO$_3$)$_2$ eluate (4g) that is combined with the SX strip liquor (i) to (4.1).

Figure 3:
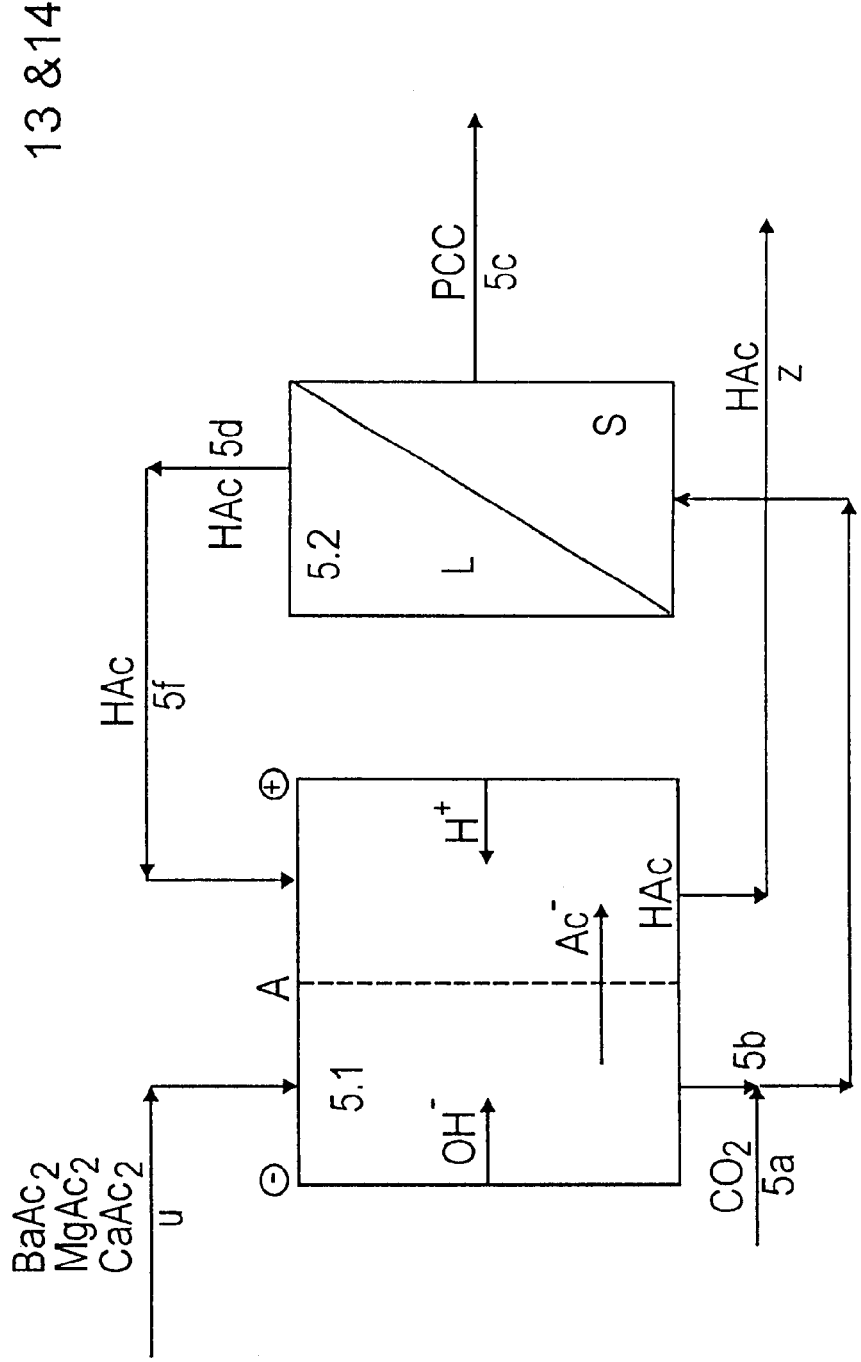
FIG. 3 is an alternative flowsheet to perform combined steps 13 and 14 in FIG. 1 by means of electrowinning.

B FIG. 3 depicts an alternative option to steps (13) and (14) in FIG. 1 to recover PCC. Heavy- and rare earth metal-depleted leachate (u) consisting essentially of CaAC$_2$ plus minor MgAc$_2$ and BaAc$_2$ is fed to the cathode compartment of an electrochemical cell (5.1) divided by an AEM (A). The cathode is of the type described in step (4) as textured DSA constructed of Ti coated with Pt and/or Ir and the anode is a GDE as described in step (4) in FIG. 1. Oxygen depolarization by the GDE enables a saving of about 80% of the power otherwise consumed by the cells. OH$^-$ radicals generated at the cathode create Ca(OH)$_2$ etc. in the catholyte that is discharged and subsequently mixed with CO$_2$ (5a) to precipitate CaCO$_3$ (+MgCO$_3$+BaCO$_3$) (PCC) that form a slurry (5b) with HAc. The slurry is filtered in (5.2). The PCC filter cake (5c) is suitable for various uses. The HAc filtrate (5.d) is routed through the anode compartment to absorb the acetate radicals of (u) migrating from the cathode through (A) to create the final depleted HAc (z) that is discharged to the cathode compartment of step (4) for addition of H$_2$O$_2$ to form leach solution.

Creation of Ca(OH)$_2$ may be assisted if necessary by dividing the foregoing step into two sequential steps entailing initial pre-treatment to remove part of the HAc to lower feed acidity (and thereby decrease the power demand for the Ca(OH)$_2$) and the final PCC recovery as described above. During the pre-treatment step CO$_2$ is not added to the catholyte discharge from the cells into which the CaAc$_2$ (u) initially feeds; instead said cells only remove a portion of the Ac$^-$ to generate a feed (u) with an increased pH of 5–6 that is discharged to secondary cells that recover PCC as shown in FIG. 3. The reactions are, During pre-treatment:
At the anode $$2OH^- \rightarrow O_2 + 2H^+ + 4e^- \tag{30}$$

At the cathode $$2OH^+ + 2e^- \rightarrow H_2 \tag{31}$$

During PCC recovery:
At the anode $$2OH^- \rightarrow O_2 + 2H^+ + 4e^- \tag{32}$$

At the cathode $$2H_2O + 2e^- \rightarrow H_2 + 2OH^- \tag{33}$$

$$CaAc_2 + 2(H_2O) \rightarrow 2HAc + Ca(OH)_2 \tag{34}$$

Using this FIG. 3 process with pre-treatment there is a theoretical power saving of about 80% over corresponding classical electrolytic methods.

Catholyte Discharge $$CO_2 + H_2O \rightarrow H_2CO_3 \tag{35}$$

$$Ca(OH)_2 + H_2CO_3 \rightarrow CaCO_3 + H_2O \tag{36}$$

The combination of the '066 patent method plus the present invention essentially eliminates environmental impact because it does not create waste piles, substantial land disturbance, toxic discharges (especially ARD) or greenhouse gas; reduces costs to enable recovery of low concentration minerals that are uneconomic by traditional means; and implements sustainable mineral resource development. Notable features of the process are that it can be highly automated and can simplify procedures by telescoping into a single system many tasks that are normally performed separately thus reducing labour costs.

EXAMPLES

The following examples are meant to illustrate but not limit the invention.

Example 1

Degradation of Cyanex 302™ by Fe or Cu

Each of the following solutions was prepared:

(A) Leachate with the composition in Table 1 made by treating a PbS ore according to the US '066 patent.

TABLE 1

Leachate Composition

| Component | (wt %) | Component | (wt %) |
|---|---|---|---|
| Pb | 6.001 | Ca | 5.64 |
| Mg | 0.49 | Ag | 0.00013 |
| Fe | 0.00148 | Sr | 0.04800 |
| Zn | 0.75 | Al + Na + Ba + Si + K | 0.707 |
| Mn | 0.421 | Other metals[1] | 0.0082 |
| Cu | 0.00584 | Comb'd acetic C$_2$H$_3$O$^-$ | 26.26 |
| Ni | 0.00126 | Free acetic C$_2$H$_4$O$_2$ | 2.04 |
| Co | 0.00068 | Water H$_2$O | 57.629 |
| Cd | 0.00287 | Total | 100.00 |

[1]Be, B, P, S, Cl, Sc, Ti, V, Cr, Ge, As, Se, Br, Rb, Y, Zr, Nb, Pd, Sn, Sb, Cs, La, Ce, Nd, Sm, Eu, Tb, Ha, Ta, W, Pt, Th, U, Au (B) Solution (A) from which Cu was extracted by means of IX (C) Solution (A) from which Fe was extracted by means of IX (D) Solution (A) from which Cu and Fe were extracted by means of IX (E) Solution (A) from which Cu, Fe, Cd and Co were extracted by means of IX (F) 0.5 M Cyanex 302 (20% v/v in UN 1223 kerosene)

The following tests were performed:

(i) 1,000 mls of (B) were thoroughly mixed with 1,000 mls of (F) in a blender for 10 minutes then allowed to settle until aqueous and organic phases were separated whereupon the organic phase was removed and stripped with 1,000 mls of 10%HNO$_3$ and the strip liquor was analysed for each of the components in solution (A). The organic phase (F) was then th oroughly wash ed with 5 volumes of distilled water and the experiment repeated six times at intervals of one week with fresh solution (B) but the same solution (F)

(ii) As in (i) but with solution (C) instead of (B)

(iii) As in (i) but with solutions (D) instead of (B)

TABLE 2

Metals extracted by Cyanex 302

| Feed | Test 1 | Test 2 | Test 3 | Test 4 | Test 5 | Test 6 | Test 7 |
|---|---|---|---|---|---|---|---|
| (i) (A-Cu) | Nil | Nil | Nil | Nil | Nil | Nil | Nil |
| (ii) (A-Fe) | Nil | Nil | Nil | Nil | Nil | Nil | Nil |
| (iii) (A-Cu—Fe) | Pb,Cd, Co | Pb, Cd, Co | Pb,Cd, Co | Pb, Cd, Co | Pb,Cd, Co | Pb, Cd, Co | Pb,Cd, Co |

The results demonstrate that the presence of either Fe or Cu in the feed solution degrades Cyanex 302 to prevent it from extracting any of the metals shown in Table 1 but if both Cu and Fe are absent Cyanex 302 will extract Pb, Cd and Co from the said metals.

Example 2
Selectivity of Cyanex 302 for Pb 1,000 mls of solution (E) above were thoroughly mixed with 500 mls of solution (F) for 10 minutes in a blender and the mixture was allowed to settle until the aqueous and organic phases had completely separated. The organic phase was decanted and scrubbed with a 5% $Pb(NO_3)_2$ solution and then stripped with a 10% $HNO_3$ solution. Analysis of the strip liquor for all of the components in solution (E) indicated that only Pb was present confirming the selectivity of Cyanex 302 for Pb from the metals in Table 1 when neither Cu, Fe, Cd nor Co is present.

As mentioned above, a macrocyclic polyether such as crown ether 4, 5' di-t-butylcyclohexano-18-crown-6 (having 6 ether groups) may be used instead of Cyanex 302 ™ to recover Pb by SX. The monothiophosphinic acids are preferred.

Example 3
Selectivity of Cyanex 302 for Zn 1,000 mls of solution (E) above from which Pb had been extracted by SX were thoroughly mixed with 500 mls of solution (F) for 10 minutes in a blender and the mixture was allowed to settle until the aqueous and organic phases had completely separated. The organic phase was decanted and scrubbed with a 5% $Zn(NO_3)_2$ solution and then stripped with a 10% $HNO_3$ solution. Analysis of the strip liquor for all of the components comprising the Pb depleted solution (E) indicated that only Zn was present confirming the selectivity of Cyanex 302 for Zn from the metals of Table 1 when neither Fe, Cu, Cd, Co nor Pb is present.

As mentioned above the Di(2-ethylhexyl) phosphoric acid ($C_{16}H_{35}O_4$) or the Di(2-ethylhexyl) phosphorothioic acid ($C_{16}H_{35}O_3PS$) e.g. having the trade name "Baysolvex" or the $C_{26}H_{34}SN_2O_2$ type reagent manufactured by Cognis Inc under the trade name LIX 34, can also be employed to selectively extract Zn in these same circumstances. The monothiophosphinic acids are preferred also in this context.

Example 4
Selectivity of Cyanex 302 for Mn 1,000 mls of solution (E) above from which Pb and Zn had been extracted by SX were thoroughly mixed with 500 mls of solution (F) for 10 minutes in a blender and the mixture was allowed to settle until the aqueous and organic phases had completely separated. The organic phase was decanted and scrubbed with a 5% $MnSO_4$ solution and then stripped with a 10% $H_2SO_4$ solution. Analysis of the strip liquor for all of the components comprising the Pb, Zn depleted solution (E) indicated that only Mn was present confirming the selectivity of Cyanex 302 for Mn from the metals of Table 1 when neither Fe, Cu, Cd, Co, Pb nor Zn is present. While other SX extractants for Mn are possible (as mentioned above), the monothiophosphinic acids are found preferable here.

Example 5
Electrowinning Metals Recovered by SX from Leachate Obtained by Use of Said US '066 Patent (i) 1,000 mls of $PbAc_2$ at pH 2.5 containing 100 gpL Pb that had been recovered during the test work performed for Example 2 was recirculated through the anode compartment of a divided electrochemical cell operated at a suitable electrical potential and current density. The anode was said DSA construction and the cathode was said GDE construction. The cell divider consisted of a MCEM and the cell gaps (anode to MCEM and cathode to MCEM) were 2 mm. Discharge from the anode compartment passed through a 1 $\mu$m filter. The cathode compartment was filled with $CaAc_2$ at pH 2.0. The Pb was recovered as $PbO_2$ from the anolyte to leave a final concentration of 20 gpL of Pb in the anolyte.

The $PbO_2$ created at the anode spalled into the discharging anolyte from where it was recovered and found to have a purity of 99.99%. Analysis of the catholyte indicated the presence of $H_2O_2$ that had been simultaneously generated by the cathode. There was no indication of Pb in the catholyte. Heating the $PbO_2$ to 725° C. converted it to PbO that was confirmed by analysis.

(ii) 1,000 mls of $Zn(NO_3)_2$ at pH2.5 containing 100 gpL of Zn that had been recovered during the test work performed for Example 3 was recirculated through the cathode compartment of a divided electrochemical cell. The cell electrodes were the said DSA type and the cell divider consisted of an AEM. The cell gaps (anode to AEM and cathode to AEM) were 2 mm. The cell was operated at a suitable electrical potential and current density to recover Zn at the cathode as $Zn(OH)_2$. The Zn was recovered from the catholyte to leave a final concentration of 20 gpL of Zn in the catholyte. The $Zn(OH)_2$ precipitated at the cathode into the depleted catholyte forming a slurry that discharged through a 1 $\mu$m filter. Depleted catholyte filtrate at pH 2.0 was returned through the anode compartment.

The $Zn(OH)_2$ created at the cathode was found to have a purity of 99.99%. There was no indication of Zn in the anolyte. Heating the $Zn(OH)_2$ to 125° C. converted it to ZnO that was confirmed by analysis.

(iii) 1,000 mls of $MnSO_4$ at pH2.5 containing 100 gpL of Mn that had been recovered during the test work performed for Example 4 was recirculated through an electrochemical cell operated at a suitable electrical potential and current density to recover the dissolved Mn at the anode as $MnO_2$. The Mn was recovered from the electrolyte to leave a final concentration of 20 gpL of Mn. The electrodes were the said DSA type. The cell gap (anode to cathode) was 2 mm. The $MnO_2$ created at the anode spalled into the discharge electrolyte. The $MnO_2$ was extracted from the discharge slurry by means of a 1 $\mu$m filter and was found to have a purity of 99.99%

Example 6
Extracting Trace Heavy and Rare Earth Metals from Cu, Fe, Cd, Co, Pb, Zn, Mn—Depleted Leachate Solution 1,000 mls of solution (A) from which the Fe, Cu, Cd, Co, Pb, Zn and Mn had been removed as described in Examples 1,2,3 and 4 were vigorously mixed with $H_2S$ for a period of 30 minutes and the resulting solution was passed through a 1 μm filter. The amount of $H_2S$ employed was twice the stoichiometric amount required to provide the S equivalent for the heavy and rare earth metals shown in Table 1 less the Cu, Fe, Cd, Co, Pb, Zn and Mn that had been removed. The filter cake consisted of a fine dark residue that had the odour of $SO_2$ upon being heated in air and consequently was assumed to consist of the sulphides of the heavy and rare earth metals in the solution all of which had been precipitated by the $H_2S$. This was confirmed by analyses that disclosed that the filtrate from the treated solution did not contain any heavy or rare earth metals.

Example 7

Recovering Ca—Mg—Ba Carbonates (PCC) From Heavy/Rare Earth Depleted Leachate Solution The 1,000 mls of solution (A) from which all the heavy and rare earth metals were removed as described in Example 6 were vigorously mixed with $NH_3$ until the pH reached 8.0. Agitation continued and $CO_2$ was added equal to twice the stoichiometric amount necessary to respectively form $CaCO_3$, $MgCO_3$ and $BaCO_3$ (collectively precipitated calcium carbonate i.e. PCC) with the dissolved Ca, Mg and Ba. The slurry consisting of solution (A) depleted of heavy and rare earth metals was passed through a 1 μm filter. The PCC filter cake was washed with three displacements of water and then dried. Analysis disclosed that the filtrate contained no remaining Ca, Mg or Ba confirming that all of these components had been extracted from the heavy and rare earth metal depleted solution (A). The filtrate was heated to 110° C. and sparged with air to remove all of the entrained $NH_3$. The task was assumed to be complete when the aroma of $NH_3$ disappeared. At that point the pH of the solution was 6.5.

Examples 2 to 7 together comprise the sequential steps of a preferred embodiment of the invention to recover PbO, ZnO, EMD and PCC as commercial products from the leachate that results from applying the leach method of the said US '066 patent to a PbS ore.

What is claimed is:

1. A process for recovering lead, zinc, and manganese from an aqueous solution containing these metals, comprising:
    (a) selecting solvent extractant able to preferentially extract lead in the presence of zinc and manganese, from the solution;
    (b) providing that the solution is free of interfering metals;
    (c) extracting the interferant-free solution with selected solvent extractant in an amount sufficient to extract the lead and separating the loaded extractant phase from the solution;
    (d) selecting solvent extractant able to preferentially extract zinc in the presence of manganese;
    (e) extracting the lead-free solution with selected solvent extractant in an amount sufficient to extract the zinc and separating the loaded extractant phase from the solution;
    (f) selecting solvent extractant able to preferentially extract manganese in the presence of any residual metals;
    (g) extracting the lead- and zinc-free solution with selected solvent extractant in an amount sufficient to extract the manganese and separating the loaded extractant phase from the solution;
    (h) separately stripping each loaded extractant phase to move lead, zinc and manganese into separate aqueous acid strip solutions; and
    (i) recovering, in a selected form, lead, zinc and manganese from the corresponding strip solutions.

2. The process of claim 1 wherein the active extractant for step (c) is selected from the group consisting of substituted monothiophosphinic acids, their salts, and macrocyclic polyethers of the crown ether type.

3. The process of claim 2 wherein selected solvent extractant comprises alkyl- or aryl-substituted monothiophosphinic acids or salts thereof.

4. The process of claim 3 wherein the monothiophosphinic acid is bis(2,4,4-trimethylpentyl) monothiophosphinic acid.

5. The process of claim 1 wherein the active extractant for step (e) is selected from the group consisting of substituted monothiophosphinic acids, di-substituted-phosphoric and -phosphorothioic acids, and $C_{26}H_{34}SN_2O_2$.

6. The process of claim 1 wherein the active extractant for step (g) is selected from the group consisting of substituted monothiophosphinic acids, disubstituted phosphinic acids, and disubstituted-phosphoric and -phosphorothioic acids.

7. The process of claim 1 wherein the selected active extractant for steps (c), (e) and (g) are respectively all di-alkyl-substituted monothiophosphinic acids.

8. The process of claim 7 step (b) wherein the interfering metals to be avoided are copper, iron, cadmium and cobalt.

9. The process of claim 1 wherein the extractant selected in step (e) is an alkyl-substituted phosphoric- or phosphorothioic-acid.

10. The process of claim 1 step (i) wherein the lead is recovered as $PbO_2$ at the anode of an electrolytic cell.

11. The process of claim 10 wherein $H_2O_2$ is produced in the cathode compartment of the lead electrowinning cell and fed to formation of ore leach solution.

12. The process of claim 1 step (i) wherein the zinc is recovered as $Zn(OH)_2$ at the cathode of an electrolytic cell.

13. The process of claim 1 step (i) wherein the manganese is recovered as $MnO_2$ at the anode of an electrolytic cell.

14. The process of claim 1 wherein the solution is formed from an ore containing calcium carbonate and calcium remaining in the leachate after step (g) is precipitated at elevated pH as carbonate by contact with $CO_2$ released during leachate formation.

15. The process of claim 14 wherein Ca, Mg and Ba remain in the leachate after extraction and the corresponding carbonates are precipitated with $CO_2$ by one of i) the direct route and ii) the indirect route via $Ca(OH)_2$ as intermediate.

16. The process of claim 1 step (h) wherein the acids for stripping are selected as follows:
    for lead—nitric acid;
    for zinc—nitric acid; and
    for manganese—sulfuric acid.

17. The process of claim 1 step (b) wherein before solvent extraction the interfering metals are removed by ion exchange.

18. The process of claim 1 wherein the extractions in steps (c), (e), and (g) are improved by selected pH adjustment of the solution for each step.

19. The process of claim 1 steps (e) and (h) wherein zinc is stripped using a $HNO_3$ and $NaNO_3$ solution; and $Zn(OH)_2$ precipitated at pH 9.2 using an NaOH and $NaNO_3$ containing solution and the $NaOH+NaNO_3$ stream and the $HNO_3+NaNO_3$ stream are regenerated.

20. A process for recovering lead, zinc, manganese and calcium from aqueous acetate solutions containing these but free of copper, iron, cadmium and cobalt, comprising:
    (a) extracting the aqueous solution at a pH of from 0.0 to 0.5 with an organic phase comprising substituted monothiophosphinic acid to extract lead;

(b) extracting the lead-free aqueous solution at a pH of from 1.0 to 1.2 with an organic phase comprising at least one of substituted monothiophosphinic acids, disubstituted-phosphoric and -phosphorothioic acids, and $C_{26}H_{34}SN_2O_2$ to extract zinc;

(c) extracting the lead- and zinc-free aqueous solution at a pH of from 3.0 to 3.5 with an organic phase comprising at least one of substituted monothiophosphinic acids, disubstituted phosphinic acids, and disubstituted-phosphoric and -phosphorothioic acids to extract manganese;

(d) stripping each of the loaded organic phases with an aqueous acid solution comprising one acid from the group consisting of acetic, nitric, hydrochloric and sulphuric except that sulphuric may be selected only for Mn stripping;

(e) electrowinning lead, zinc and manganese from their respective strip solutions and recycling the strip acids to step (d);

(f) treating the remaining aqueous solution containing calcium, as acetate or hydroxide, with carbon dioxide to precipitate calcium carbonate;

(g) recovering and recycling acetic acid to form starting solution; and (h) recovering lead, zinc and manganese as oxides and a precipitate comprising calcium carbonate.

* * * * *